Aug. 19, 1958

H. W. BOOTHROYD 2,847,896

CARTRIDGE RATIO SELECTORS FOR USE IN THE BELTING OF AMMUNITION

Filed Aug. 30, 1955

Inventor
Howard W. Boothroyd
By his Attorney
Thomas J Ryan

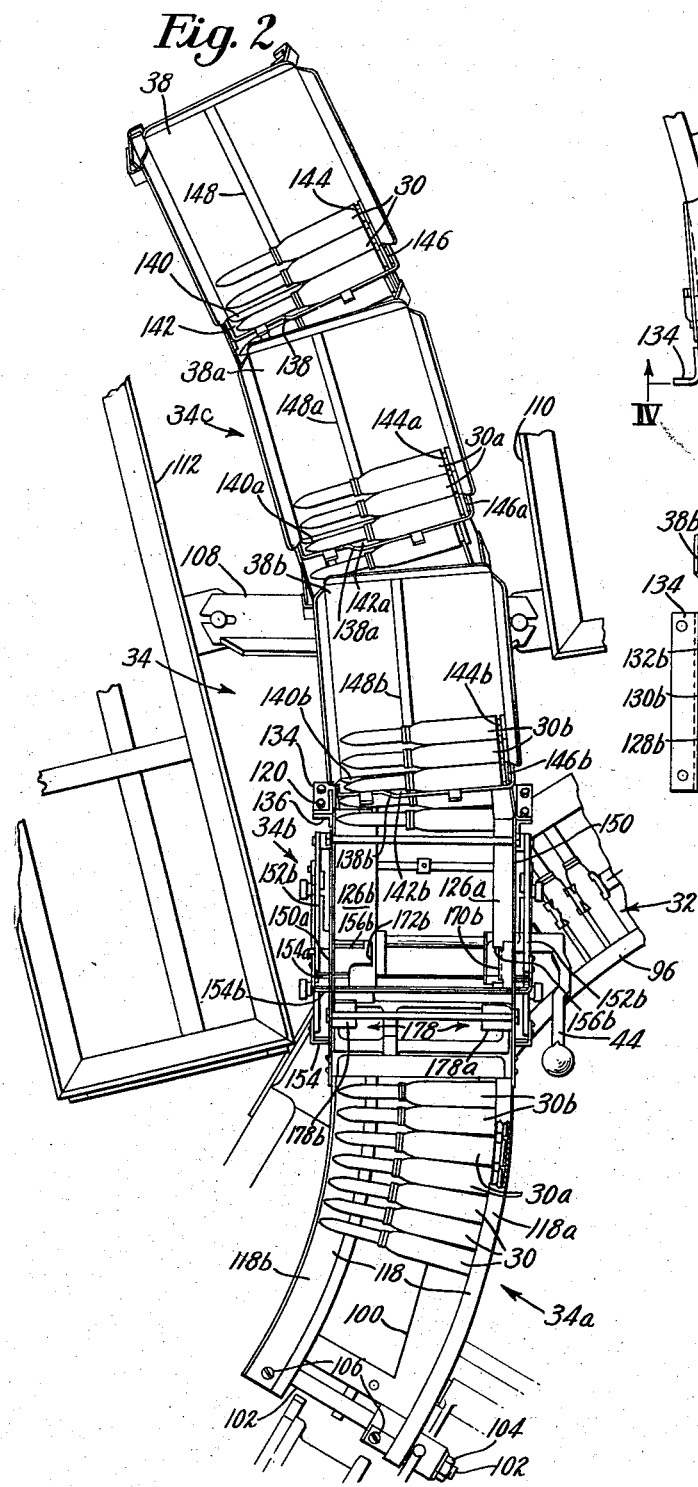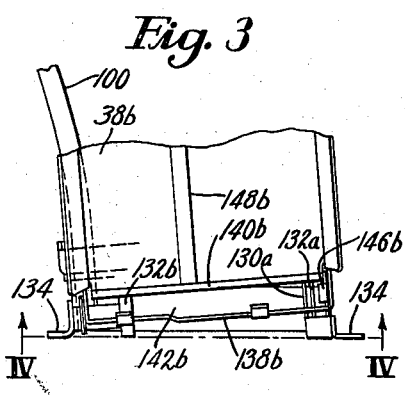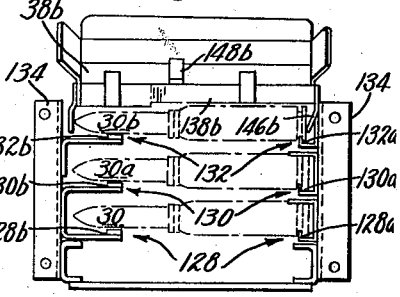

Aug. 19, 1958  H. W. BOOTHROYD  2,847,896
CARTRIDGE RATIO SELECTORS FOR USE IN THE
BELTING OF AMMUNITION
Filed Aug. 30, 1955  6 Sheets-Sheet 3
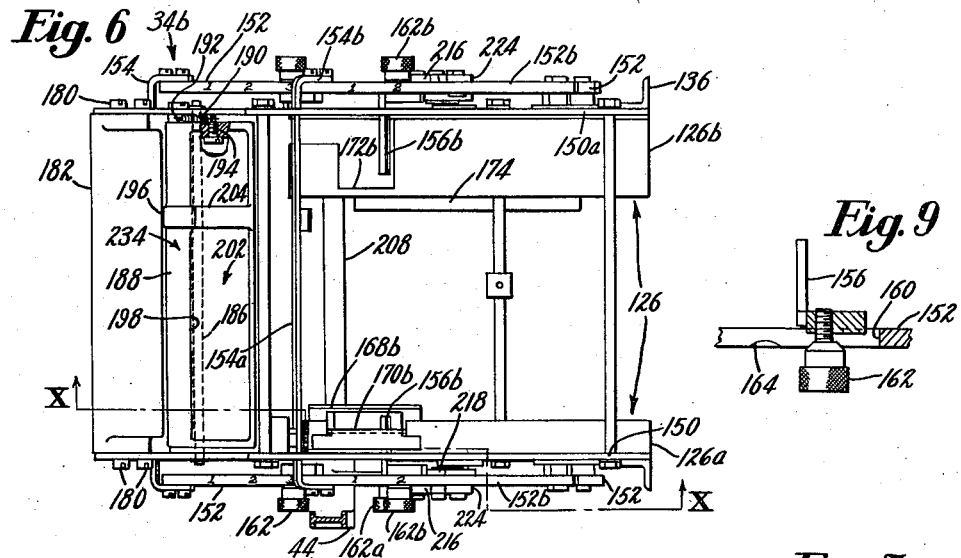
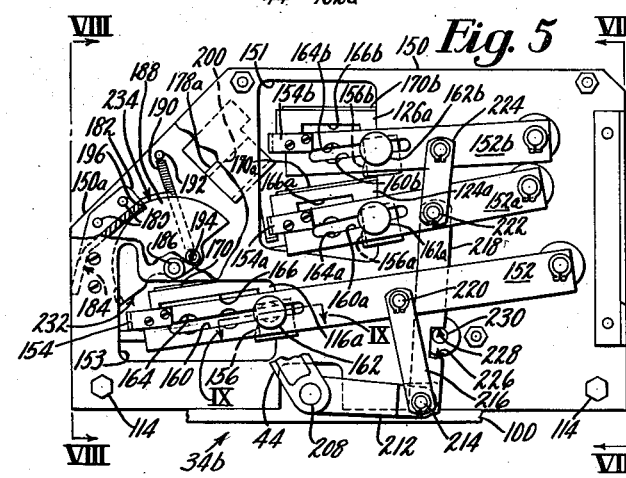
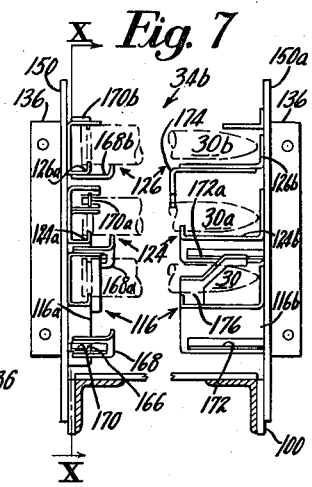
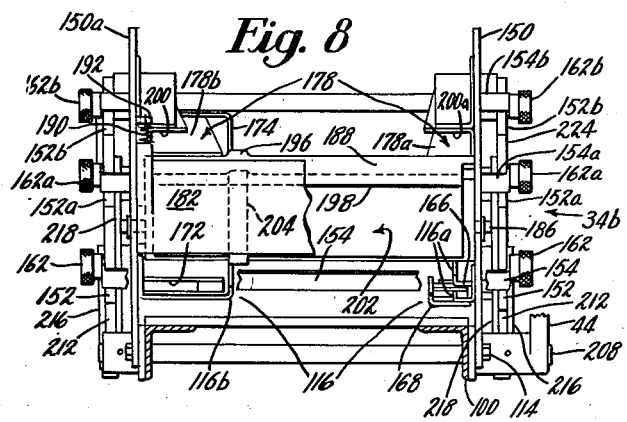
*Inventor*
Howard W. Boothroyd
By his Attorney
Thomas J. Ryan Inventor
Howard W. Boothroyd
By his Attorney
Thomas J. Ryan

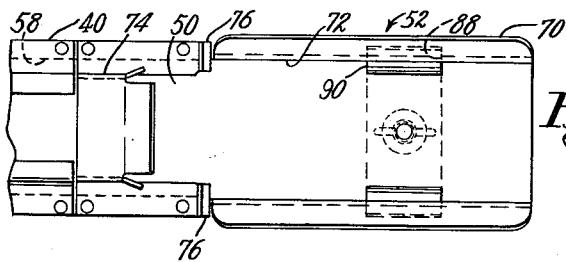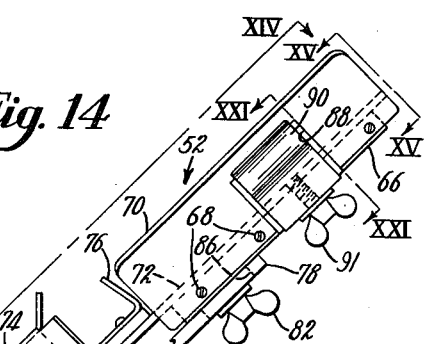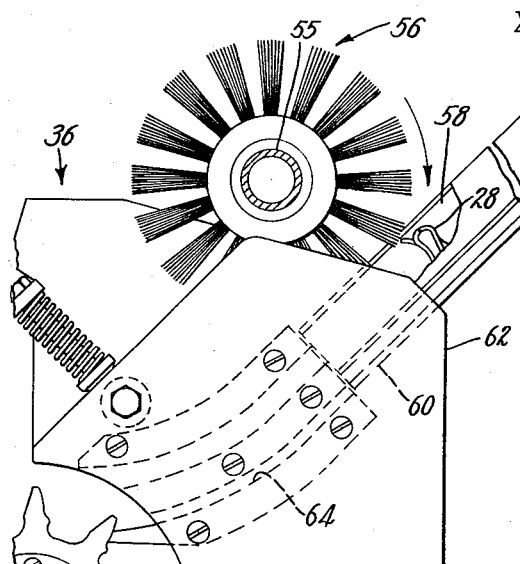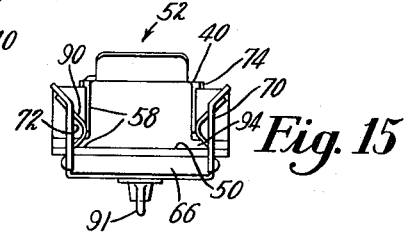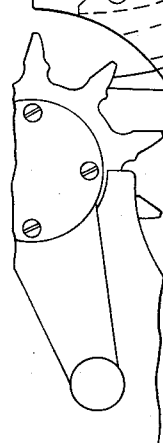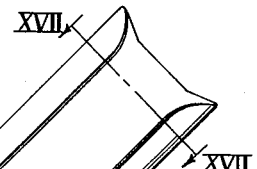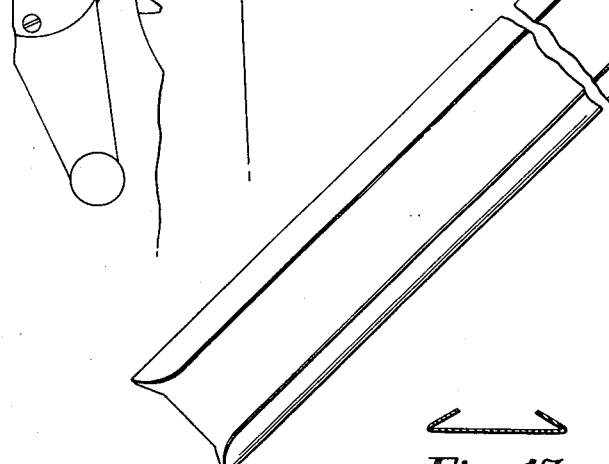

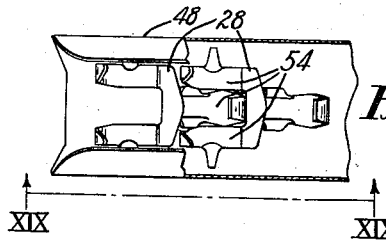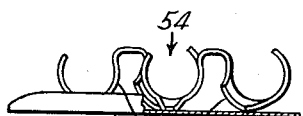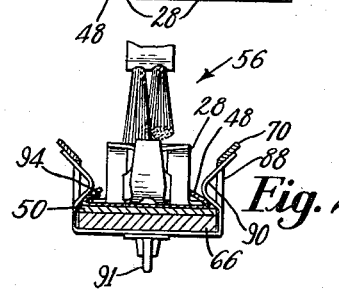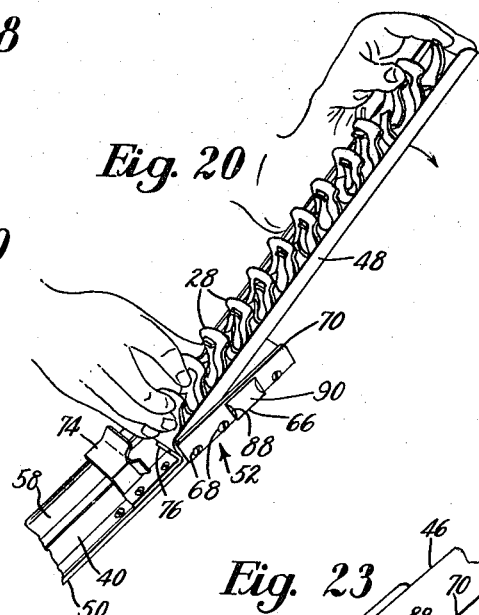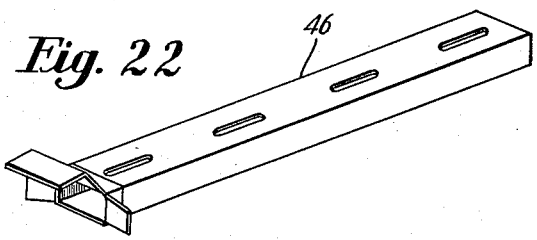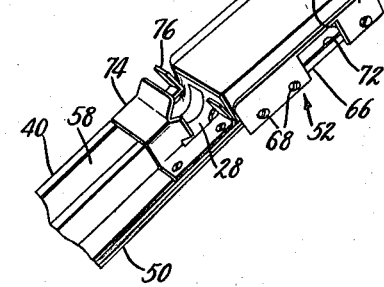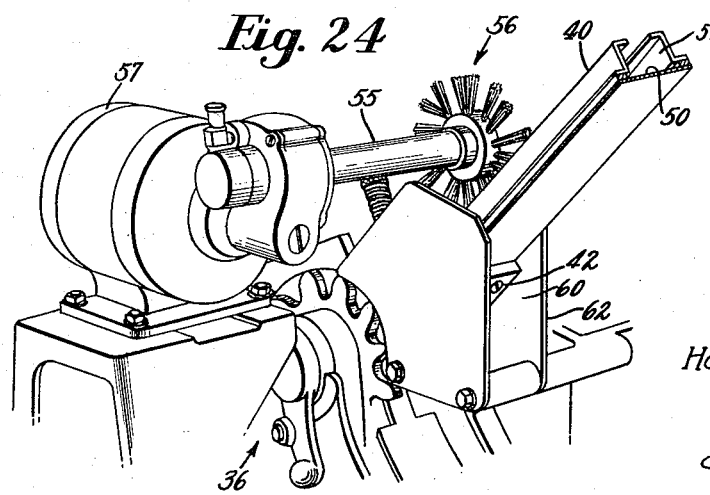

United States Patent Office 2,847,896
Patented Aug. 19, 1958

2,847,896

CARTRIDGE RATIO SELECTORS FOR USE IN THE BELTING OF AMMUNITION

Howard W. Boothroyd, Wenham, Mass., assignor to United Shoe Machinery Corporation, Boston, Mass., a corporation of New Jersey Application August 30, 1955, Serial No. 531,449

7 Claims. (Cl. 86—48)

This invention relates to mechanism for use in the belting of ammunition and more specifically to a ratio selector for delivering to a link loading machine cartridges of different types in a predetermined type and number sequence.

It is common practice in the belting of ammunition in which, for example, three different types of cartridges are assembled in links by the use of the link loading machine, for three operators to place "in rotation" into a ramp leading to said machine predetermined numbers of cartridges of said types respectively. The above practice fails to supply cartridges fast enough to operate the link loading machine at capacity and is also subject to errors inherent in the manual handling of cartridges.

It is an object of the present invention to provide a ratio selector by the use of which cartridges of different types may be quickly and effectively supplied in the proper type and number sequence for use in a link loading machine. With the above object in view, and in accordance with a feature of the present invention, applicants have provided, in an apparatus for use in the belting of ammunition, trays for receiving, respectively, different types of cartridges, a ratio selector unit having tracks, means for delivering the cartridges presented to the trays to the tracks, respectively, of the selector unit, and a selector ramp leading to a link loading machine, said ratio selector unit comprising mechanism for causing a predetermined number of cartridges on each of the tracks of said unit to be delivered to the ramp in a predetermined sequence with relation to a predetermined number of leading cartridges released from the other tracks of said unit.

By the use of the illustrative ratio selector, cartridges of different types may be delivered to the link loading machine in the desired type and number sequence with less expense and with greater accuracy than heretofore possible.

The present invention consists in the above and hereinafter described novel features, reference being had to the accompanying drawings which illustrate one embodiment of the invention selected for purposes of illustration, said invention being fully disclosed in the following description and claims.

In the drawings,

Fig. 2 is a view on the line II—II of Fig. 1 showing the ratio selector in plan;

Fig. 3 is a plan view of the lower portion of the forward of three cartridge receiving trays of the ratio selector;

Fig. 4 is a view on the lines IV—IV of Figs. 1 and 3 showing portions of the forward tray and also showing lower, middle and upper tracks of a selector feeder along which cartridges are delivered to lower, middle and upper tracks respectively of a ratio selector unit;

Figs. 5 and 6 show side and plan views respectively of the ratio selector unit, portions of which have been broken away;

Fig. 7 is a rear end view of the ratio selector unit on the line VII—VII of Fig. 5, a vertical median portion of said unit having been broken away;

Fig. 8 is a front view of the ratio selector unit, portions of which have been broken away, on the line VIII—VIII of Fig. 5;

Fig. 9 is a view along the line IX—IX of Fig. 5 showing in detail an adjustable rear gate of the ratio selector unit;

Fig. 13 shows a portion of the link loading machine, and means comprising a chute and a carton and tray holder for supplying links packed in cartons or trays to the chute, and also shows a rotary bristled brush or impeller for insuring that the links shall be moved down the chute and into the link loading machine in interengaging or overlapping relation;

Fig. 14 is a plan view of the chute and the carton and tray holder on the line XIV—XIV of Fig. 13;

Fig. 15 is an end view of the carton and tray holder on the line XV—XV of Fig. 13;

Fig. 16 is a plan view of a portion of one of the link loading trays;

Fig. 17 is a section on the line XVII—XVII of Fig. 16;

Fig. 18 shows in plan one of the trays, partially broken away, with links mounted in it;

Fig. 19 is a view, partly in section, on the line XIX—XIX of Fig. 18;

Fig. 20 shows in perspective a tray of links being placed by an operator on the upper or holder portion of the link chute;

Fig. 21 is a section on the line XXI—XXI of Fig. 13 showing the tray loaded with links positioned in the holder portion of the chute;

Fig. 22 shows, in perspective, one of the cartons in which the links are commonly shipped;

Fig. 23 is a perspective view showing the carton of Fig. 22 positioned in the holder portion of the chute; and Fig. 24 is a perspective view showing a portion of the link loading machine illustrated in Fig. 13.

Figure 1:
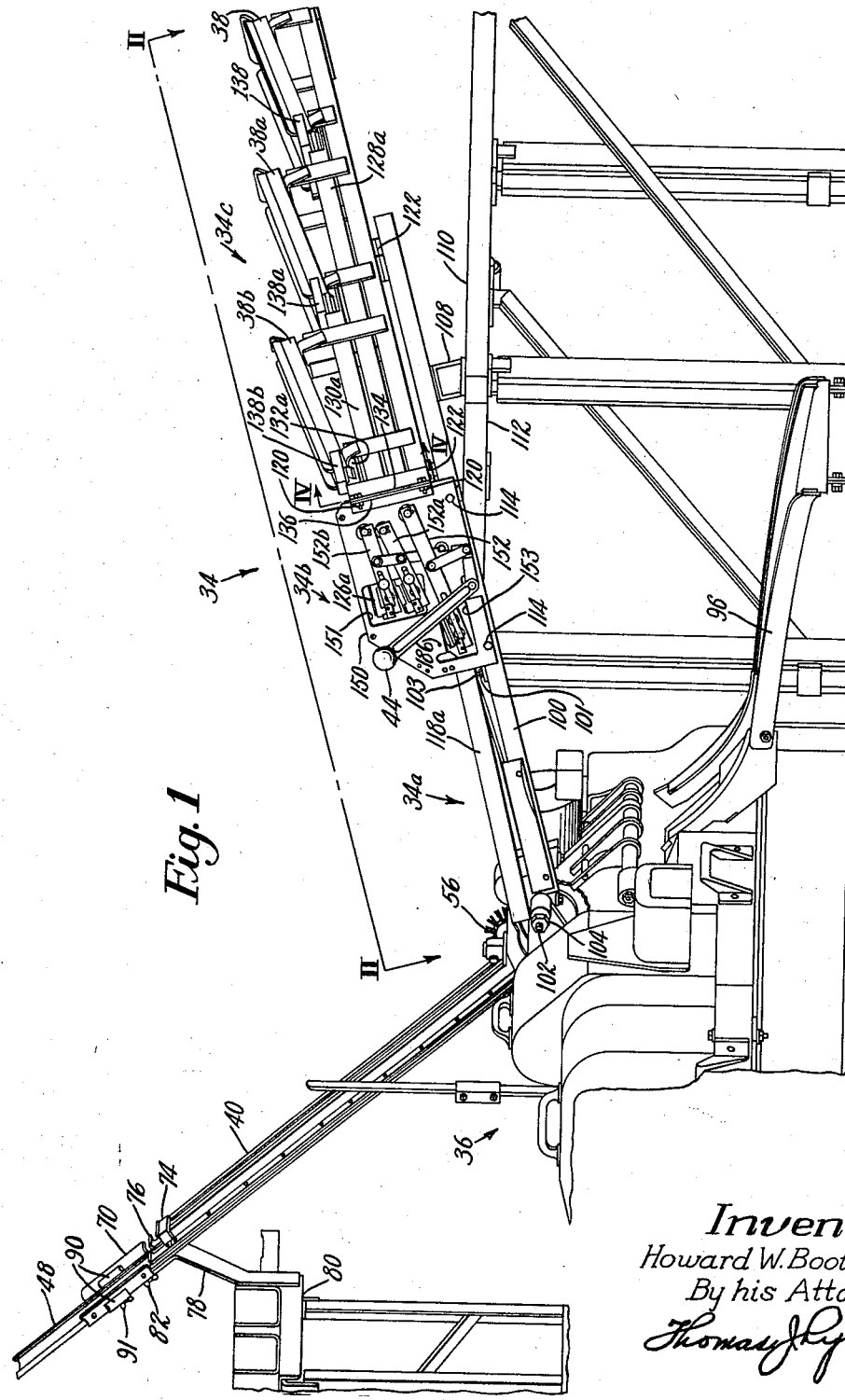
Fig. 1 is a view showing in perspective a link loading machine and in side elevation a ratio selector for use with said machine.

The present invention is disclosed with reference to apparatus for assembling links 28 (Fig. 19) and groups of armor piercing, high explosive incendiary and incendiary cartridges 30, 30$^a$ and 30$^b$ in a desired type and number sequence to produce belted ammunition 32 (Fig. 2), said apparatus comprising a ratio selector 34 which is adapted to deliver the groups of the different types of cartridges in the proper type and number sequence to a link loading machine 36 (Fig. 1). The ratio selector 34 comprises a selector ramp 34$^a$ leading to the link loading machine 36, a ratio selector unit 34$^b$ for delivering, as will be explained, cartridges to the selector ramp; and a ratio selector feeder 34$^c$ (Figs. 1 and 2) having trays 38, 38$^a$ and 38$^b$ for receiving the cartridges 30, 30$^a$ and 30$^b$ respectively and feeding them to the ratio selector unit. The cartridges 30, 30$^a$ and 30$^b$ and the links 28 are commonly shipped to zones of action in separate boxes (not shown) such as disclosed in an application for United States Letters Patent Serial No. 344,524, filed March 25, 1953, now Patent 2,750,028 in the names of Robert H. Bode et al., said cartridges and links being assembled in said zones.

The cartridges 30, 30$^a$ and 30$^b$ and the links 28 are assembled to provide the belted ammunition 32 by the use of the link loading machine 36 which is not disclosed in detail herein and in which the cartridges are moved lengthwise into interengaging links passing through the machine. The links 28 are supplied to the link loading machine 36 by a chute 40 the lower end of which is secured by screws 42 (Fig. 24) to said machine. The cartridges 30, 30ᵃ and 30ᵇ, which are commonly supplied to the link loading machine 36 in the desired type and number sequence by the selector ramp 34ᵃ, are inserted into the links 28 to form the belted ammunition 32, it being common practice, as above explained, to insert in three successive links the armor piercing cartridges 30 and to insert in the two following links the high explosive incendiary cartridges 30ᵃ and then to insert in the next two links the incendiary cartridges 30ᵇ.

In order to operate the link loading machine 36 to capacity and to conserve labor as well as to eliminate inaccuracies inherent in the above-mentioned manual selecting operation, applicants have provided the illustrative ratio selector 34 comprising the ratio selector unit 34ᵇ which includes mechanism responsive to movement of a manually operated handle 44 from a retracted to a projected position and back to the retracted position, as will be hereinafter explained, to cause the desired number of types or groups of cartridges 30, 30ᵃ and 30ᵇ to be delivered in the proper type sequence to the selector ramp 34ᵃ and accordingly to the link loading machine 36. The main portion of the link loading machine 36, which serves to force the cartridges 30, 30ᵃ and 30ᵇ into the links 28, does not constitute part of the present invention and accordingly is not disclosed in detail herein.

The links 28 are delivered to the chute 40 from a fibre board carton 46 (Figs. 22 and 23) or from a metal tray 48, the chute having secured to an upper extension of a floor 50 thereof a carton or tray receiver 52, hereinafter described. In order to insure that the links 28 shall be fed into the link loading machine 36 in the desired overlapping relation in which they are shown arranged in the tray 48 (Figs. 18 and 19) so that the cartridges 30, 30ᵃ and 30ᵇ in said machine may be quickly and effectively driven lengthwise into cylindrical channels 54 formed in part by walls of bifurcated portions of one of adjacent pairs of links and walls, respectively, of flange portions of the other of said adjacent pairs of links, the chute 40 has associated with it a rotary bristle brush feeder or impeller 56 which is wiped against upper portions of the links traveling down the chute and yieldingly urges the links together into the above-mentioned overlapping relation. The rotary feeder or impeller 56 is keyed to a shaft 55 (Figs. 13 and 24) operatively connected to an electric motor 57.

The chute 40 has a link receiving passage 58 and fits in a notch 60 (Fig. 24) of a bracket 62 bolted to a frame of the link loading machine 36 and is secured by the screws 42 to said bracket with the lower end of the passage 58 in substantial alinement with a link receiving passage 64 (Fig. 13) through which the links 28 are fed to positions (not shown) in which the cartridges 30, 30ᵃ and 30ᵇ, delivered to said machine by the chute 34ᵃ, are inserted lengthwise into the overlapping links.

The upper extension of the floor 50 of the chute 40 has riveted to it a block 66 and secured by screws 68 to the opposite lateral faces of the block are thin metal side pieces 70 which form with said floor a channel 72 in which the carton 46 fits. Riveted to the upper portion of the link chute 40 is a flared throat lug 74 for insuring that the links 28 shall be properly guided into the passage 58 of the chute, said throat lug having formed integral with it upturned flanges 76 constituting a stop with which the lower end of the carton 46 is engaged as it is moved in place between the side pieces 70 of the receiver 52 into engagement with the upward extension of the floor 50 of the chute. The lower end of the tray 48, positioned widthwise upon the upper extension of the floor 50 of the chute 40, by means hereinafter described, is also positioned lengthwise preparatory to transferring its links to the chute 50, by engagement with the flanges 76.

The upper end of the link chute 40 is supported by a bracket 78 the lower end of which is welded to a table 80 (Fig. 1) adapted to support boxes (not shown) in which the link filled cartons 46 or the trays 48 are delivered. The upper end of the bracket 78 is adjustably secured to the block 66 by the use of a winged screw 82 (Fig. 13) threaded into the block and extending through an elongated slot 86 in the bracket. The side pieces 70 are suitably spaced to receive between them the carton 46 filled with links 28 and are adapted slightly to yield away from each other, if necessary, the yield of the side pieces being sufficient to insure that the carton shall be held between the side pieces with its lower end in engagement with the flanges 76.

With a view to accommodating the trays 48, the side pieces 70 of the receiver 52 are provided with openings 88 for receiving a spring clip 90 which is adapted to receive said trays and is secured to the block 66 by the use of a wing nut 91 threaded into the block. The spring 90 forms with the upward extension of the floor 50 of the chute 40 notches 94 (Figs. 15 and 21) for receiving, after the sides of the clip have been sprung outwardly by downward pressure of the trays 48, V-shaped lateral edges of the tray which is filled with links and the lower end of which is in engagement with the flanges 76.

When the links 28 and the cartridges 30, 30ᵃ and 30ᵇ supplied to the link loading machine 36 by the chute 40 and the selector ramp 34ᵃ, respectively, have been assembled in the machine in the form of belted ammunition 32 they are fed down a chute 96 (Figs. 1 and 2), the ammunition being packaged in belts of desired lengths in boxes (not shown).

The ratio selector 34 is mounted on a support frame 100 having notches (not shown) adapted to receive a mounting bar 102 (Figs. 1 and 2), which is secured by a nut 104 to the link loading machine 36, said frame being secured to said bar by screws 106 and being supported at its upper end by a cross bar 108 secured to and extending between tables 110, 112 on which cartridge receiving boxes (not shown) are supported.

Secured by screws 114 to the support frame 100 with sections 116ᵃ, 116ᵇ (Figs. 7 and 8) of a lower track 116 thereof approximately continuous with sections 118ᵃ, 118ᵇ (Fig. 2) of a track 118 of the selector ramp 34ᵃ, is the ratio selector unit 34ᵇ which is secured by screw and nut combinations 120 (Figs. 1 and 2), hereinafter referred to, to the selector feeder 34ᶜ, said feeder being supported by and being welded at 122 to the support frame 100. The selector ramp 34ᵃ is secured to the support frame 100 by one of the screws 106 and by nuts 101 (only one shown) which are threaded onto screws 103 (only one shown) secured to sections 118ᵃ, 118ᵇ of the track 118 of the selector ramp.

The sections 116ᵃ, 116ᵇ of the lower track 116 of the ratio selector unit 34ᵇ and sections 124ᵃ, 124ᵇ (Fig. 7) and sections 126ᵃ, 126ᵇ of the middle and upper tracks 124, 126, respectively, of said unit are approximately continuous with sections 128ᵃ, 128ᵇ (Fig. 4); sections 130ᵃ, 130ᵇ; and 132ᵃ, 132ᵇ of lower, middle and upper tracks 128, 130, 132, respectively, of the selector feeder 34ᶜ which is provided with laterally extending flanges 134 adapted to be engaged by laterally extending flanges 136 of the ratio selector unit. The above-mentioned screw and nut combinations 120 extend through alined holes in the flanges 134, 136 and serve to secure the selector feeder 34ᶜ in its proper position with relation to the ratio selector unit 34ᵃ preparatory to welding said feeder to the support frame 100.

The cartridge receiving trays 38, 38ᵃ and 38ᵇ of the selector feeder 34ᶜ have welded to their forward ends U-shaped abutments 138, 138ᵃ and 138ᵇ (Figs. 1, 2, 3 and 4) and depending aprons 140, 140ᵃ and 140ᵇ forming between them openings 142, 142ᵃ and 142ᵇ, respectively, through which the cartridges 30, 30ᵃ and 30ᵇ moving down the trays, respectively, drop onto the lower, middle and upper tracks 128, 130 and 132 (Fig. 4) of the selector feeder 34c.

In order to insure that the cartridges 30, 30a and 30b on the trays 38, 38a and 38b, respectively, shall drop into their positions illustrated in Fig. 4 onto the tracks 128, 130 and 132 with extractor grooves 144, 144a and 144b of the cartridges receiving lip portions of the sections 128a, 130a and 132a of said tracks, there are formed integral with the U-shaped abutments 138, 138a and 138b, respectively, depending flanges 146, 146a and 146b which may be referred to as deflector members and are engaged by the rear ends of the cases of the cartridges as said cartridges drop from the trays through the openings 142, 142a and 142b thereby causing said cartridges to be moved bodily lengthwise to the left, as viewed in Fig. 4, into their desired positions on the track sections. The flanges 146, 146a and 146b may be described as being arranged at one end of and as depending from the openings 142, 142a and 142b respectively and also as having cartridge-engaging faces which extend widthwise of associated tracks toward the lip portions thereof as they extend downwardly and which are adapted to be engaged by the rear ends of the cases of cartridges falling through said openings and to deflect the cartridges lengthwise whereby to guide the cartridges onto the track with extractor grooves of the cases of the cartridges registering with the lip portions of the tracks.

The trays 38, 38a and 38b have rear ends and sides which flare upwardly and outwardly and substantially flat bottoms provided with longitudinal steel ribs 148, 148a and 148b, respectively (Figs. 2, 3 and 4), adapted to be engaged by the cartridges 30, 30a and 30b, respectively, the widths of said trays being slightly greater than the lengths of the cartridges accommodated.

Journaled on studs brazed to opposite side plates 150, 150a of the ratio selector unit 34 are lower, middle and upper arms 152, 152a and 152b to the forward ends of which are screwed front gates 154, 154a and 154b respectively which, when arranged in their starting or retracted positions shown in Figs. 5, 6, 8, 10 and 12, extend across the lower, middle and upper tracks 116, 124 and 126, respectively, and prevent cartridges on said tracks from moving down and off the tracks.

Carried by and secured for adjustment on the arms 152, 152a and 152b are lower, middle and upper rear gates 156, 156a and 156b, respectively, side portions of which fit in slots 160 (Figs. 5 and 9), 160a and 160b formed in the arms and have threaded into them shoulder screws 162, 162a and 162b extending through the slots and used to clamp, in different positions determined by recesses 164, 164a and 164b, the rear gates to their associated arms. In order to accommodate the middle and upper front gates 154a, 154b and the middle and upper rear gates 156a, 156b, the side plates 150, 150a have recesess 151 (Figs. 1 and 5) formed in them and in order to accommodate the lower front and rear gates 154, 156 said side plates have formed in them recesses 153.

The sections 116a, 124a and 126a and the sections 116b, 124b and 126b of the tracks 116, 124 and 126, respectively, are illustrated as welded to the sides 150, 150a, respectively, of the selector unit 34b, said track sections, as above explained, being substantially continuous with the track sections 128a, 130a and 132a and the track sections 128b, 130b and 132b of the tracks 128, 130 and 132 of the selector feeder 34c.

The entire upper track 126 of the ratio selector unit 34 is straight and is arranged generally parallel to the upper and lower faces of the sides plates 150, 150a, said unit being so mounted on the support frame 100 (Fig. 1) that this track is inclined at approximately 15° to the horizontal. The middle and lower tracks 124, 116 have rear end portions which are parallel to the upper track 126 and have forward portions which are inclined slightly downward with relation to said rear end portions in order to provide between the lower and the middle tracks on the one hand, and the middle and the upper tracks on the other hand, the proper clearances for accommodating the rear gates 156, 156b, respectively, and operating mechanism therefor.

The sections 116a, 124a and 126a of the tracks 116, 124 and 126 of the ratio selector unit 34b have upturned flanges which are engaged by the extractor grooves 144, 144a and 144b of the cases of the cartridges 30, 30a and 30b. As best shown in Fig. 7 the sections 116b and 124b of tracks 116 and 124 have inner upturned lip portions which are engaged by the projectile portions of the cartridges 30, 30a, respectively, and the section 126b of the track 126 has a flat face which is engaged by the projectile portions of the cartridges 30b. The upper front gate 154b extends forward of the upper track 126 and accordingly clears this track as it moves between its retracted and projected positions. The middle and the lower tracks 124, 126, respectively, are cut away to allow the front gates 154a, 154 to move to and from their retracted positions across these tracks.

To enable the rear gates 156, 156a and 156b adjacent to the side plate 150 to be moved to and from their projected positions (Fig. 11) across the paths of movement of the cartridges 30, 30a and 30b on the tracks 116, 124, 126, the track sections 116a, 124a and 126a have formed in them openings 166, 166a and 166b, respectively. In order to support the cartridges 30, 30a and 30b as they traverse the openings 166, 166a and 166b, the track sections 116a, 124b and 126a have welded to their lower faces bifurcated bridge rails 168, 168a and 168b which constitute parts of the track sections 116a, 124a and 126a, respectively, and are engaged by the cylindrical portions of the cases of the cartridges traversing said openings. To insure that the cartridges 30, 30a and 30b shall be held against the bridge rails 168, 168a nad 168b as they override the recesses 166, 166a and 166b, the track sections 116a, 124a and 126a are suitably cut away to receive retaining tracks 170, 170a and 170b which are welded to said track sections and are engaged by upper portions of the extracting grooves 144, 144a and 144b of said cartridges, respectively, moving down the track sections.

In order to allow the rear gates 156, 156a and 156b adjacent to the side plate 150a to move between their retracted and projected positions, the track sections 116b, 124b and 126b are provided with openings 172 (Figs. 7 and 8), 172a and 172b. The middle and upper track sections 124b, 126b have welded to their lower faces depending lugs 176, 174, respectively, which are engaged by the upper portions of the cartridges 30, 30a on the lower and middle tracks 116, 124, respectively, and which facilitate the guiding of cartridges down these tracks.

Figure 10:
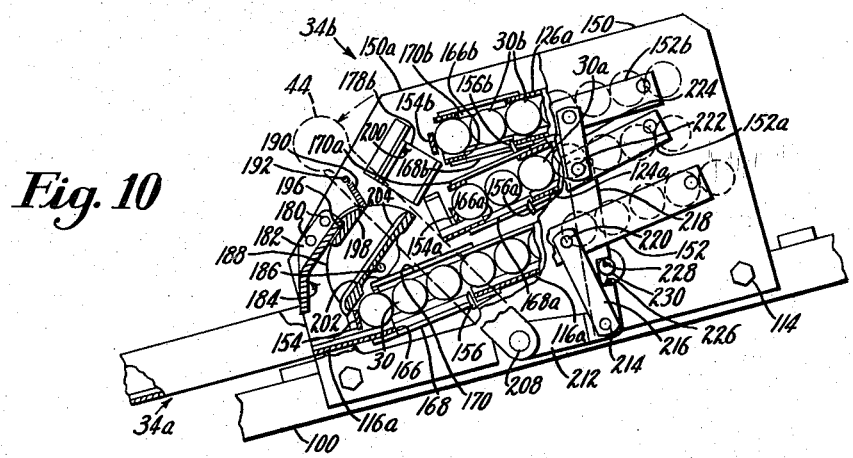
Figs. 10, 11 and 12 are views generally on the lines X—X of Figs. 6 and 7 showing the ratio selector unit during three different stages of its operation.
Figure 11:
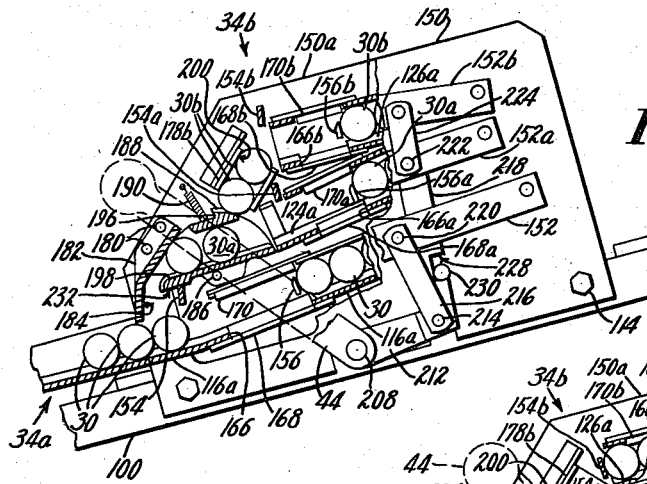

Welded to the inner walls of the side plates 150, 150a at the forward ends of the sections 126a, 126b of the upper track 126 are sections 178a (Figs. 2, 5 and 8), 178b, respectively, of a transfer ramp 178 adapted to receive, when the front gate 154b is raised, one or two cartridges 30b from the upper track 126 in accordance with the setting of the rear gate 156b upon the arm 152b. Also secured to the inner walls of the side plates 150, 150a by screws 180 is an abutment 182 having a deflecting face 184 (Figs. 5, 10 and 11).

Journaled on a bearing rod 186 secured to the side plates 150, 150a is a transfer chute 188 which is constantly urged counterclockwise, as viewed in Figs. 5, 10, 11 and 12 by a spring 190 upper and lower ends of which are attached, respectively, to a pin 192 carried by the side plate 150a and to a screw 194 threaded into the transfer chute, counterclockwise movement of the transfer chute being limited by the engagement of a shoulder 196 of the chute with the abutment 182. When the shoulder 196 of the transfer chute 188 is in engagement with the abutment 182 a passage 198 of the transfer chute is in alinement with passages 200, 220a (Fig. 8) of the sections 178ª, 178ᵇ of the deflector ramp 178. A floor 202 of the transfer chute 188 is provided with a rib 204 adapted to be engaged by the projectile portions of the cartridges 30, 30ª and 30ᵇ in said chute.

The arms 152, 152ª and 152ᵇ, which are pivoted on the studs welded to the outside walls of the side plates 150, 150ª, are moved simultaneously between rest or retracted positions (Figs. 5 and 10) in which the front gates 154, 154ª and 154ᵇ are arranged in front of the leading cartridges 30, 30ª and 30ᵇ on the lower, middle and upper tracks 116, 124 and 126, respectively, and the rear gates 156, 156ª and 156ᵇ are arranged below the tracks, and projected positions (Fig. 11) in which the front gates have been moved away from their cartridge detaining positions across the tracks and the rear gates 156, 156ª and 156ᵇ have been moved across the tracks, by swinging counterclockwise the handle 44.

The handle 44 is pinned to a shaft 208 journaled in the side plates 150, 150ª and forms with the shaft a multiarm lever comprising a pair of arms 212. Secured to each of the arms 212 of the multiarm lever is a bearing pin 214 having pivotally connected to its links 216, 218 the upper ends of which are pivotally connected by bearing pins 220, 222 to associated lower and middle arms 152, 152ª respectively. Pivotally mounted on each of the bearing pins 222 is a link 224 the upper end portion of which is pivotally connected to an associated upper arm 152ᵇ. Counterclockwise and clockwise movements of the handle 44, as viewed in Figs. 5, 10, 11 and 12 are limited, respectively, by engagement of shoulders 226, 228 of the links 218 with stop studs 230 brazed to the sides 150, 150ª of the ratio selector unit 34ᵇ. When the handle 44 is swung counterclockwise from its rest position shown in Fig. 10 the front gates 154, 154ª and 154ᵇ which, when the ratio selector unit 34ᵇ is at rest, lie across the end portions of the lower, middle and upper tracks 116, 124, and 126 and prevent the cartridges 30, 30ª and 30ᵇ, respectively, from moving down the tracks, are swung upward to projected positions (Fig. 11) above the tracks and the rear gates 156, 156ª and 156ᵇ are swung upward between the third and fourth cartridges 30 on the lower track and between the second and third cartridges on the middle and upper tracks, the rear gates acting as "pickers" to allow a predetermined number of cartridges to move from the tracks. When the front gates 154, 154ª and 154ᵇ and the rear gates 156, 156ª and 156ᵇ are again moved to their retracted positions the cartridges 30, 30ª and 30ᵇ on the tracks move down said tracks until they engage the front gates.

Figure 12:
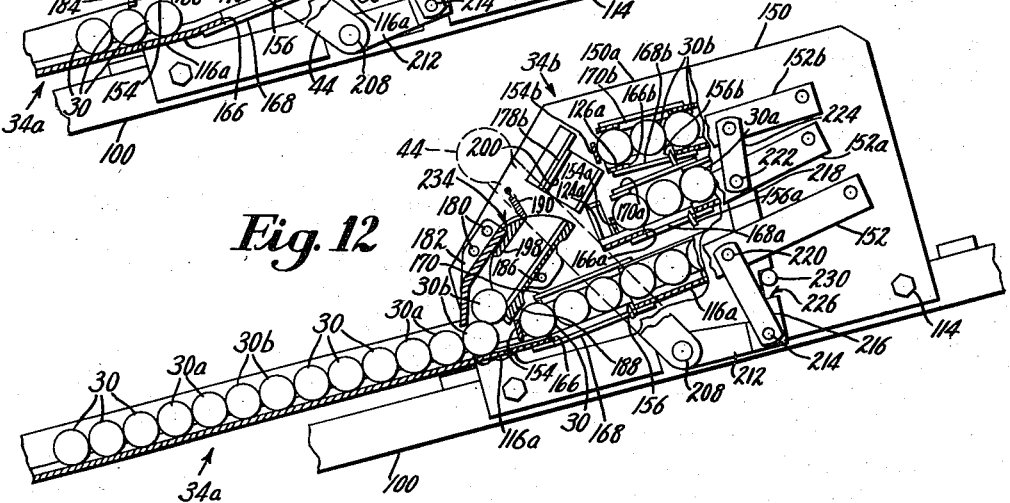

As the arms 152 are raised the front gate 154 is forced against a face 232 of the transfer chute 188 causing said chute to be rotated clockwise, as viewed in Figs. 10, 11 and 12, until the shoulders 226 of the links 218 engage the stop studs 230 at which time the transfer chute has rotated to its position shown in Fig. 11 in which its passage 198 is in substantial alinement with the middle track 124 and is in a position to receive the two leading cartridges 30ª from the middle track. When the transfer chute 188 is in its projected position shown in Fig. 11 a face 234 of said chute retains two cartridges 30ᵇ in the transfer ramp 178 and the chute is held in such a position that it allows the selected number of cartridges 30 released from the lower track 216 (three as illustrated) to move onto the selector ramp 34ª.

After the handle 44 has been swung counterclockwise to its projected position shown in Fig. 11 it is swung back to its retracted position shown in Figs. 10 and 12 and determined by the engagement of the shoulders 228 of the links 218 with the stop pins 230. At this time the passage 198 of the transfer chute 188 is in alinement with the passages 200, 200ª of the transfer ramp 178 and the lower end of the passage 198 of said chute is open to the track 118 of the selector ramp 34ª thus permitting the two cartridges 30ª in the transfer chute followed by two cartridges 30ᵇ in the transfer ramp 178 to drop onto the selector ramp behind three cartridges 30 released from the lower track 116.

In view of the foregoing it will be clear that, when the trays 38, 38ª and 38ᵇ are loaded with cartridges 30, 30ª and 30ᵇ, respectively, and the machine is adjusted as herein illustrated, said cartridges may be quickly and accurately delivered to the selector ramp 34ª in the desired type and number sequence by moving the handle 44 clockwise and counterclockwise between its limits. By moving the rear gates 156, 156ª and 156ᵇ into different adjusted positions on their associated arms 152, 152ª and 152ᵇ, respectively, the number sequence of the cartridges may be varied within limits.

Having thus described my invention, what I claim as new and desire to secure by Letters Patent of the United States is:

1. In an apparatus for use in the belting of ammunition, trays for receiving respectively different types of cartridges, a ratio selector unit having tracks, means for delivering the cartridges presented to the trays to the tracks respectively, and a selector ramp, said ratio selector unit comprising means including a transfer chute movable between two operating positions for causing a predetermined number of the leading cartridges on each of the tracks of said unit to be delivered to the ramp in a predetermined sequence with relation to a predetermined number of leading cartridges released from the other tracks of said unit.

2. In a cartridge ratio selector for use in the belting of ammunition, inclined lower, middle and upper tracks for receiving respectively cartridges of different types, a selector ramp in register with the lower track and adapted to receive one or more cartridges released from the lower track, a transfer ramp for receiving one or more cartridges released from the upper track, a transfer chute for receiving one or more cartridges released from the middle track, means for releasing one or more cartridges from each of the tracks, mechanism operative in timed relation with said means for moving the transfer chute between a projected position in which it receives cartridges released from the middle track, prevents movement to the selector ramp of cartridges which are released by said means from the upper track and are in the transfer chute and allows said one or more cartridges released from the lower track to be available for the selector ramp, and a retracted position in which the cartridges in the transfer chute are delivered to the selector ramp behind the cartridges from the lower track and in which the cartridges in the transfer ramp are delivered through the transfer chute to the selector ramp behind the cartridges from the middle track.

3. In a cartridge ratio selector for use in the belting of ammunition, upper, middle and lower tracks for receiving respectively cartridges of different types, a selector ramp substantially continuous with the lower track, a transfer ramp adapted to receive cartridges from the upper track, a transfer chute which has a passage and is journaled for movement between a retracted position, in which its passage is in alinement with the transfer ramp and is open to the selector ramp, and a projected position in which its passage is in alinement with the middle track and is closed from the transfer and the selector ramps, front gates movable between retracted positions, in which they are engaged respectively by the leading cartridges in the upper, middle and lower tracks to limit movement of the cartridges down the tracks, and projected positions in which they are moved away from the cartridges to allow said cartridges to move down said tracks, rear gates which are movable between retracted positions in which they are held out of engagement with the cartridges, and projected positions in which they are moved respectively between two of the cartridges on the upper, middle and lower tracks to allow the cartridges below them on the tracks to move down said tracks and to detain the cartridges above them on the tracks from moving down said tracks, and means for simultaneously moving in timed relation the transfer chute and the front and rear gates between their retracted and projected positions.

4. In a cartridge ratio selector for use in the belting of ammunition, inclined lower, middle and upper tracks for receiving respectively cartridges of different types, means for detaining the cartridges against movement on the lower, middle and upper tracks and for simultaneously releasing a predetermined number of cartridges from the lower, middle and upper tracks, a selector ramp for receiving released cartridges from the lower track, a transfer ramp for receiving cartridges released from the upper track, a transfer chute movable in response to movement of said means between a projected position in which it receives cartridges released from the middle track, prevents movement of the cartridges received by it to the selector ramp and retains in the transfer ramp the cartridges which said transfer ramp has received from the upper track, and a retracted position in which the passage in the transfer chute is open to the transfer and the selector ramps thereby allowing cartridges in the transfer chute to be moved by gravity to the selector ramp and to allow cartridges in the transfer ramp to pass through the passage in the transfer chute into the selector ramp behind the cartridges from the middle track.

5. In a cartridge ratio selector for use in the belting of ammunition, a selector ramp, inclined lower, middle and upper tracks down which different types of cartridges respectively move by the action of gravity, front gates movable from retracted positions in which they are arranged across the tracks and are engaged respectively by the leading cartridges on the tracks and thus limit movement of said cartridges down said tracks, to projected positions in which they are moved from across said tracks and allow the cartridges freely to move down the tracks, a transfer chute having a passage, rear gates movable between retracted positions in which they are moved from across said tracks and allow cartridges freely to move down the tracks and projected positions in which they are engaged by the cartridges on the tracks and thus limit movement of the cartridges down the tracks, a transfer ramp into which cartridges in the upper track drop when permitted by movement of an associated front gate to its projected position, a transfer chute having a passage, said transfer chute being movable between a retracted position, in which its passage is closed off from the middle track and is open to the selector and the transfer ramps, and a projected position in which its passage is in alinement with the middle track and is closed off from the selector and the transfer ramps, and means for moving the front gates, the rear gates and the transfer chute from their retracted to their projected positions to cause one or more of the cartridges on the lower ends of the lower, middle and upper tracks respectively to be released for movement to the selector ramp, to the passage of the transfer chute and to the transfer ramp and for thereafter moving the front gates, the rear gates and the transfer chute back to their retracted positions for causing the cartridges in the passage of the transfer chute to be dumped onto the selector ramp behind the cartridges received from the lower track and to cause the cartridges in the transfer ramp to be dropped through the passage of the transfer chute and onto the selector ramp behind the cartridges dropped from the middle track.

6. In a cartridge ratio selector for use in the belting of ammunition, upper, middle and lower tracks for receiving respectively cartridges of different types, a selector ramp substantially continuous with the lower track, a transfer ramp adapted to receive cartridges from the upper track, a stop, a transfer chute which has a passage and which is journaled for pivotal movement between a retracted position, which is determined by the engagement of said chute with the stop and in which the passage of the chute is in alinement with the transfer ramp and is open to the selector ramp, and a projected position in which the passage of the chute is in alinement with the middle track and is closed off from the transfer and the selector ramps, a spring for constantly urging the chute into its retracted position against the stop, front gates movable between retracted positions, in which they are engaged respectively by the leading cartridges in the upper, middle and lower tracks for limiting movement of the cartridges down said tracks, and projected positions in which said front gates are moved away from the cartridges to allow said cartridges to move down said tracks, rear gates which are movable between retracted positions in which they are held out of the paths of movement of the cartridges down the tracks to projected positions in which they are moved respectively between two of the cartridges on the upper, middle and lower tracks thereby allowing cartridges below them to move down said tracks and to detain cartridges above them on the tracks from moving down said tracks, and means for moving the front and rear gates between their projected and their retracted positions, said transfer means being moved against the action of the spring to its projected position in response to movement of the gates to their projected positions and being moved to its retracted position by the spring in response to movement of the gates back to their retracted positions.

7. In a cartridge ratio selector, an inclined track which is adapted to receive cartridges and comprises a lip portion, and inclined tray for receiving cartridges and having at its lower end a dependent flange and an abutment forming with said flange an opening which is positioned over said track and is adapted to allow the cartridges moving from the tray to fall successively through it and onto said track, and a member arranged at one end of and depending from the opening, said member having a face which extends widthwise of the track toward said lip portion as it extends downward and which is adapted to be engaged by the rear ends of the cases of the cartridges falling through said opening and to deflect said cartridges lengthwise whereby to guide the cartridges onto the track with extraction grooves of the cases of the cartridges registering with the lip portion of the track.

References Cited in the file of this patent
UNITED STATES PATENTS

| | | |
|---|---|---|
| 1,879,156 | Forster | Sept. 27, 1932 |
| 2,369,785 | Kuehlman | Feb. 20, 1945 |
| 2,413,316 | Freeman | Dec. 31, 1946 |
| 2,415,941 | Edson et al. | Feb. 18, 1947 |
| 2,448,072 | Ardell | Aug. 31, 1948 |